US00H002087H

(19) United States

(12) Statutory Invention Registration

Balliett et al.

(10) Reg. No.: US H2087 H

(43) Published: Nov. 4, 2003

(54) PICKLING OF REFRACTORY METALS

(75) Inventors: Robert W. Balliett, Westborough, MA (US); Arthur H. Bronstein, Canton, MA (US); Thomas J. Ryan, Canton, MA (US); Michael Greengart, Newton, MA (US); Daniel J. Moynihan, Watertown, MA (US); Douglas A. Ryan, Stoughton, MA (US); Paul Queneau, Golden, CO (US); Mark Berggren, Golden, CO (US); Brandon Hagen, Golden, CO (US)

(73) Assignee: H. C. Starck, Inc., Newton, MA (US)

(21) Appl. No.: 09/081,321

(22) Filed: May 19, 1998

(51) Int. Cl.[7] ..... C23G 23/00

(52) U.S. Cl. ..... 134/3

(58) Field of Search ..... 134/2, 3, 10, 41

(56) References Cited

U.S. PATENT DOCUMENTS 5,164,016 A * 11/1992 Henriet et al. ..... 134/2
5,215,624 A * 6/1993 Dastolfo, Jr. et al. ..... 156/637
5,248,386 A * 9/1993 Dastolfo, Jr. et al. .... 156/659.1
5,338,367 A * 8/1994 Henriet et al. ..... 134/3
5,354,383 A * 10/1994 Bianchi ..... 134/3
5,690,748 A * 11/1997 Henriet ..... 134/3
5,843,240 A * 12/1998 Pedrazzini et al. ..... 134/3
5,908,511 A * 6/1999 Bianchi ..... 134/3

* cited by examiner

*Primary Examiner*—Michael J. Carone
*Assistant Examiner*—M. Thomson
(74) *Attorney, Agent, or Firm*—Jerry Cohen; Perkins, Smith & Cohen, LLP

(57) ABSTRACT

Refractory metal pickling bath of $HF/H_2O_2$ aqueous solution with recovery of the etched metal as a salt thereof and separation of dissolved impurities taken from the refractory metal, with avoidance of drawbacks of state of the art $HF/HNO_3$ pickling solutions.

7 Claims, 10 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Effect of Temperature on Tantalum Pickling Rate $$5Ta + 5H_2O_2 + 10HF \longrightarrow 2TaF_5 + 10H_2$$
$$2FE + 3H_2U_2 + 6HF \longrightarrow 2FE\ F_3 + 6H_2$$
$$2Cr + 3H_2U_2 + 6HF \longrightarrow 2Cr\ F_3 + 6H_2$$
$$Ni + F_5 + 2KF \longrightarrow K2TaF_7$$

Effect of Temperature on Pickling of Tantalum wire

Effect of Agitation on Pickling of Tantalum Wire

Effect of HF Concentration on Pickling of Tantalum Wire

Effect of $H_2O_2$ Concentration on Pickling of Tantalum Wire

Effect of Concentration on Pickling of Tantalum Wire

Effect of Ni + Cr Concentration on Pickling of Tantalum Wire

Effect of Stabilizer Concentration on Pickling of Tantalum Wire

Effect of Fe Concentration on Pickling of Tantaum Wire

PICKLING OF REFRACTORY METALS

BACKGROUND OF THE INVENTION

The present invention relates to process enhancements in pickling of refractory metals (Ta, Nb, Ti, Mo, W, V, Cr, Zr, Hf and alloys and mixtures), and more particularly Ta and Nb, incident to cleaning mill products and/or fabricated parts at the conclusion of mill processing or end product fabrication and at the end of intermediate steps, e.g. pickling drawn Ta wire or strip after each drawing or rolling pass, or each series of passes in a larger sequence, to remove lubricant and surface contaminants prior to an intermediate anneal. The term pickling is used herein in a broadest sense of cleaning the surface of a metal by a strong etching solution. Small, but valuable, portions of the metal are necessarily removed from the surface of the metal product and have to be recovered.

It is known that conventional pickling baths for Ta which include $HF/HNO_3$ solutions are vulnerable to nitrous oxide emissions and associated hazards to the environment and also leading to instability of the bath itself. It is also known that nitrous oxide emissions from $HNO_3$-containing pickling baths can be reduced by controlled hydrogen peroxide addition. German patent application A-25-32773; U.S. Pat. No. 4,938,838; and Japanese patent application 50-110682. The mechanisms of $HF/H_2O_2$ interaction are discussed in an article of Chakravorti et al. "First Electrosynthesis of Transition Metal Peroxofluoro Complexes . . . " at 12 (6) Polyhedron 683-87 (1993) (concerning synthesis of such complexes in dissolution of powders of Ta, Nb, V, Mo, W) and in the textbook, Cotton et al, Advanced Inorganic Chemistry 791-92 (5th Ed'n Wiley). However, a practical in-line pickling process for pickling with substantially reduced nitrous oxide emissions remains elusive.

It is an object of this invention to provide such a process.

SUMMARY OF THE INVENTION

We have determined that wire and strip of Ta and other refractory metals can be effectively pickled at high rates to remove contaminants located at the metal surface as well as lubricant residues, without excessive loss of metal, by a pickling bath comprising an aqueous solution of $HF/H_2O_2$ with the HF and $H2O_2$ in a weight ratio (gpl/gpl) of from 4:1 to 15:1, while limiting the absolute amounts of HF to under 800 gpl, preferably under 400 gpl and more preferably about 10–200 gpl $H_2O_2$ and to under 200 gpl and more preferably about 20–50 in relation to reasonably sized batches of tantalum (and correspondingly reduced as to other more etchable metals) to avoid excessive metal removal. The conditions are adjusted to achieve the effective surface etching of metal in 5–20 minutes. Temperature of the bath should be maintained between 20 and 40° C. for a median bath composition of 200 gpl HF and 10–50 gpl $H_2O_2$.

Commercially available $H_2O_2$ solutions include stabilizers that may be provided in amounts of about 50–100% of peroxide amounts. Build up of Ta in solution to upper limits must be resolved by a bath regeneration step that includes Ta recovery. Addition of potassium fluoride (KF) provides a means of such regeneration/recovery as is indicated in the Apr. 23, 1982 Russian Inventor's Certificate of Balyasov et al. entitled "A Solution for the Chemical Pickling of Niobium and Its Alloys". KF is added initially in small amounts to precipitate $K_2TaF_7$ crystals and limit heat due to exothermic reaction, then in larger amounts and with cooling to accelerate crystallization, the KF amounts being about 1.0 to 1.5 times stoichiometric in relation to estimated Ta content in solution to limit excessive KF residuals in the bath after regeneration.

The bath composition can accept a loading of etched metal up to and in some cases exceeding 300 gpl than allowing long usage before metal disposal and regeneration. Dissolved tantalum can be processed to a salt form ($K_2TaF_7$) reusable as a tantalum source by reduction in a manner well known in the art.

Other objects, features and advantages will be apparent from the following detailed description of preferred embodiments taken in conjunction with the accompanying drawings in which:

Figure 1:
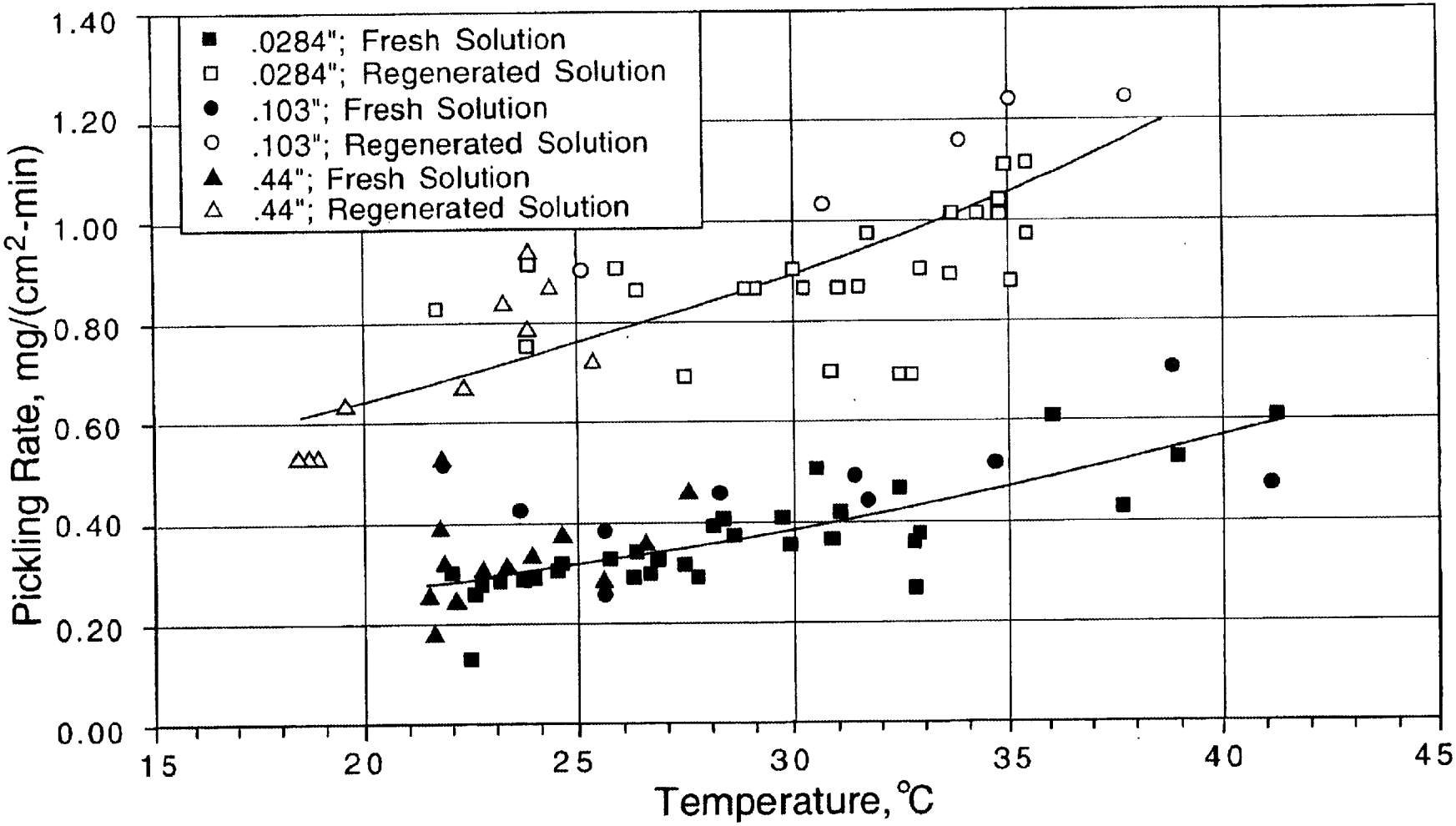
FIG. 1 is a graph of pickling rate vs. temperature as determined in pilot plant studies described below.
Figures 1A, 1B:
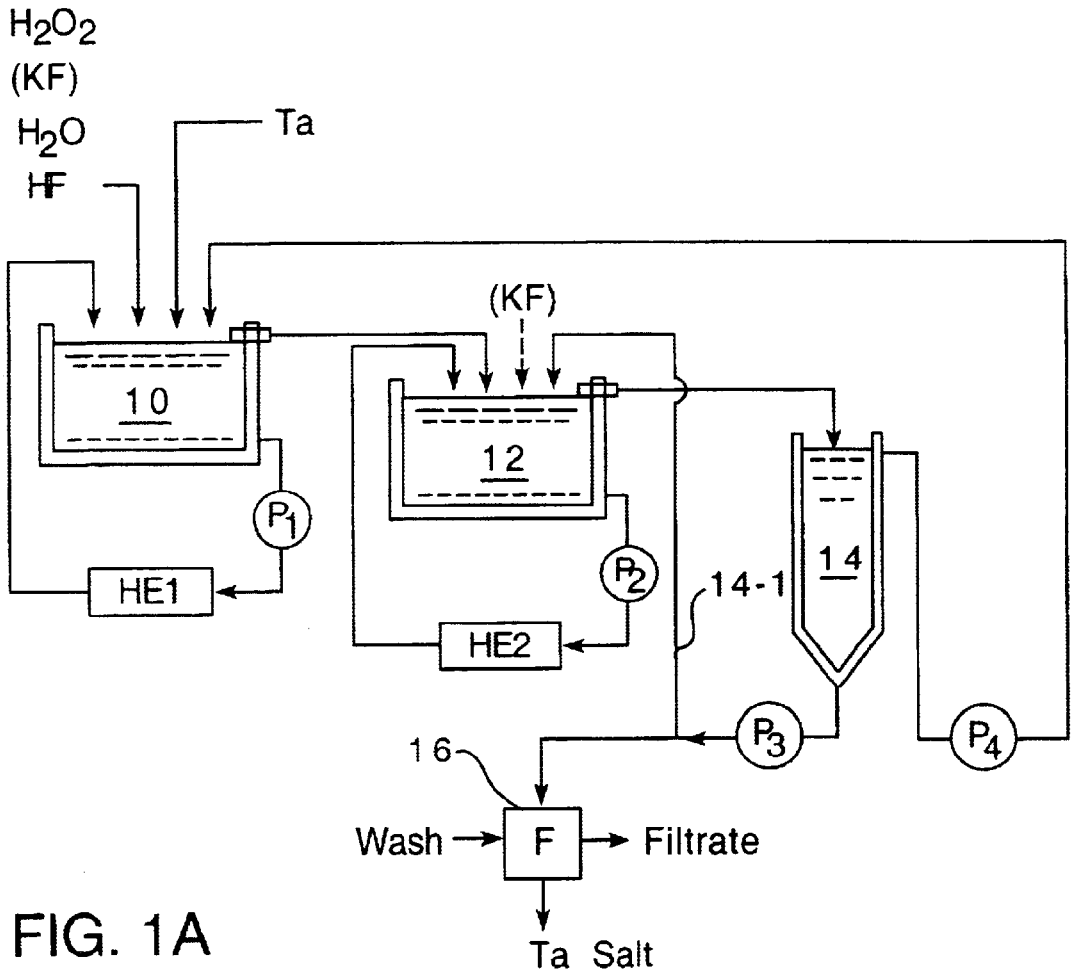
Figure 2:
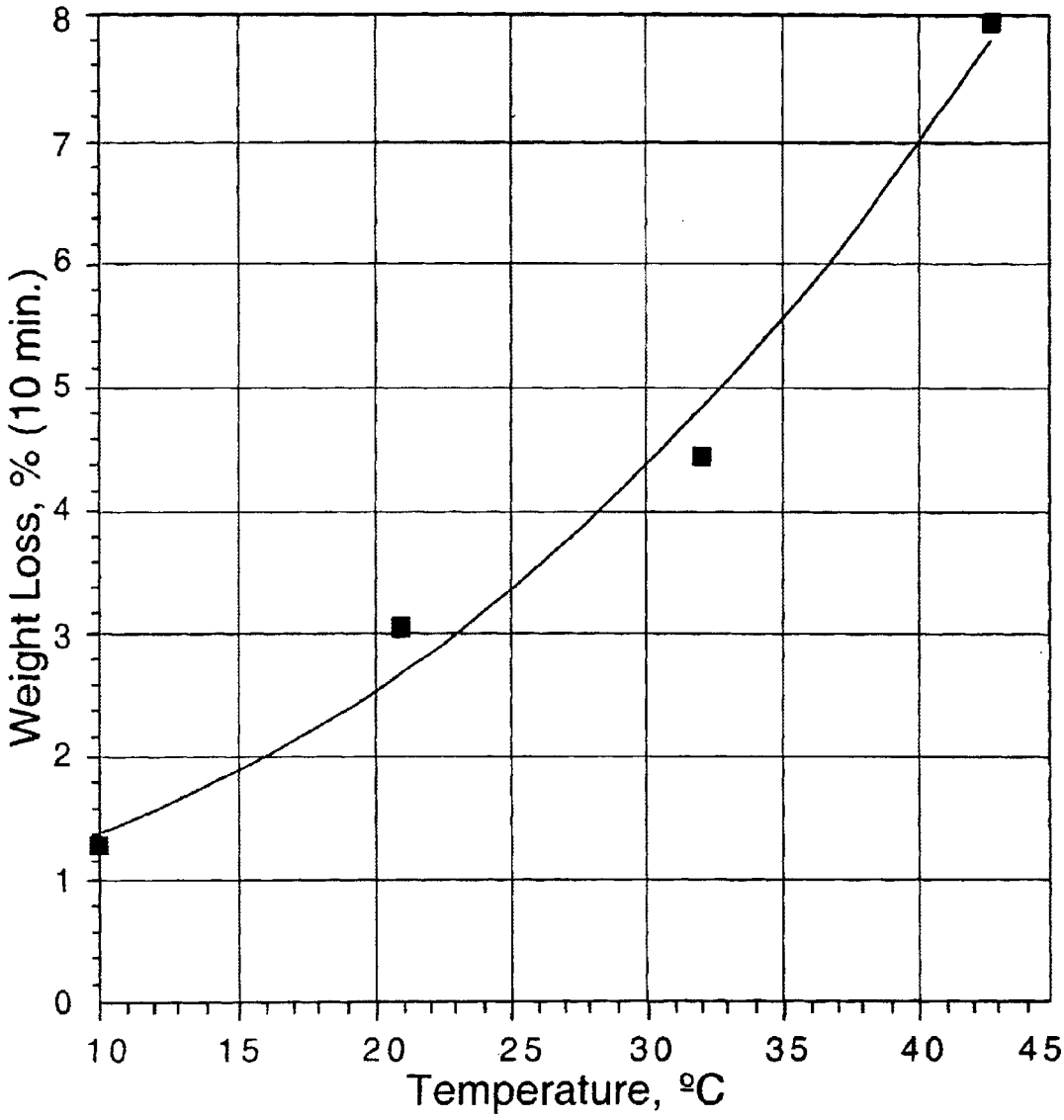

A flowsheet of a projected plant layout for applying the invention is shown in FIG. 1A and the operative equations for dissolution reactions therein are shown in FIG. 1B;

FIGS. 2–9 are traces of tantalum weight loss (as a percentage) vs. variations of each of certain parameters of the pickling process as determined in laboratory tests described below.

DETAILED DESCRIPTION OF PREFERRED EMBODIMENTS

EXAMPLE 1

Figure 3:
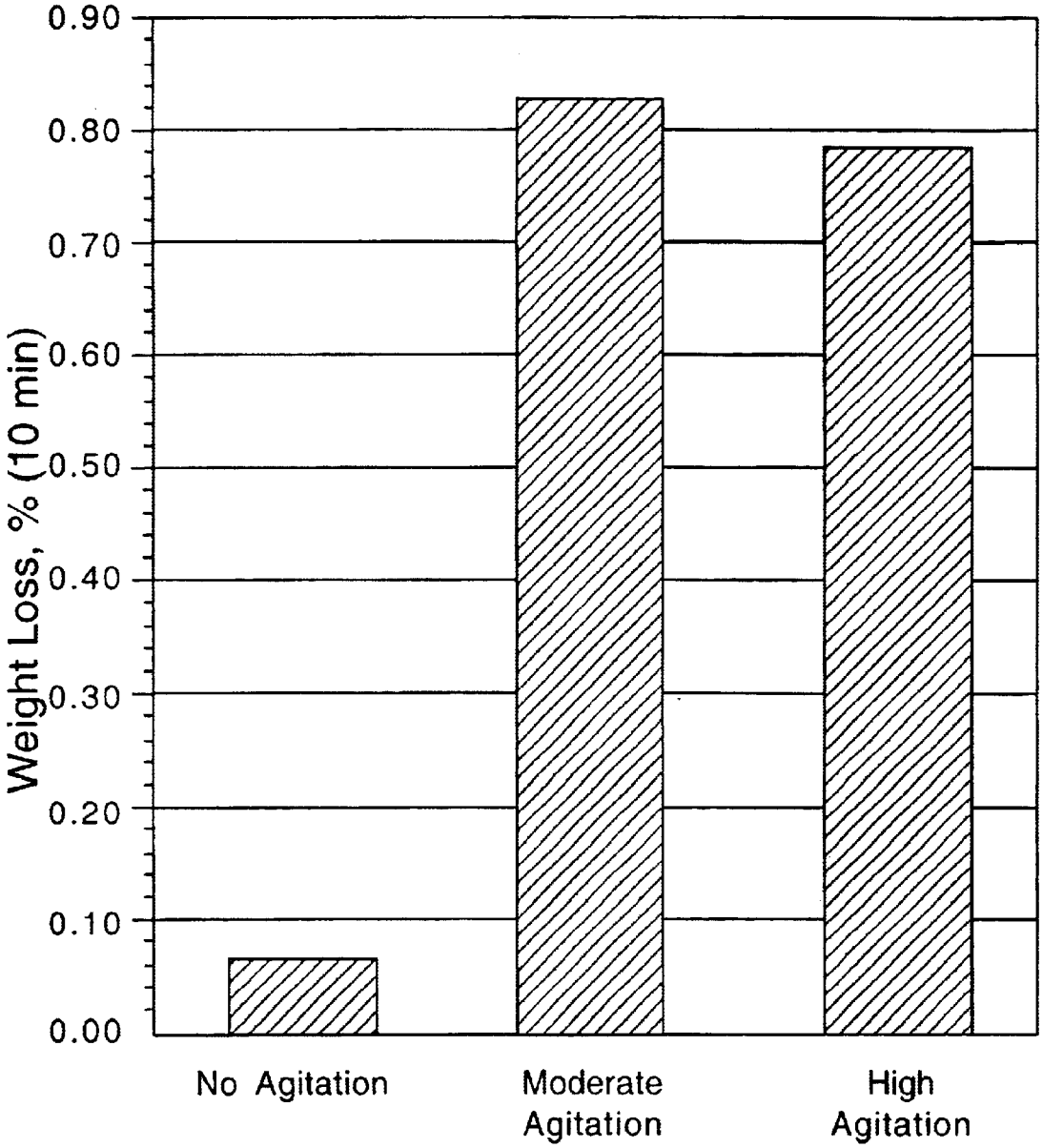
Figure 4:
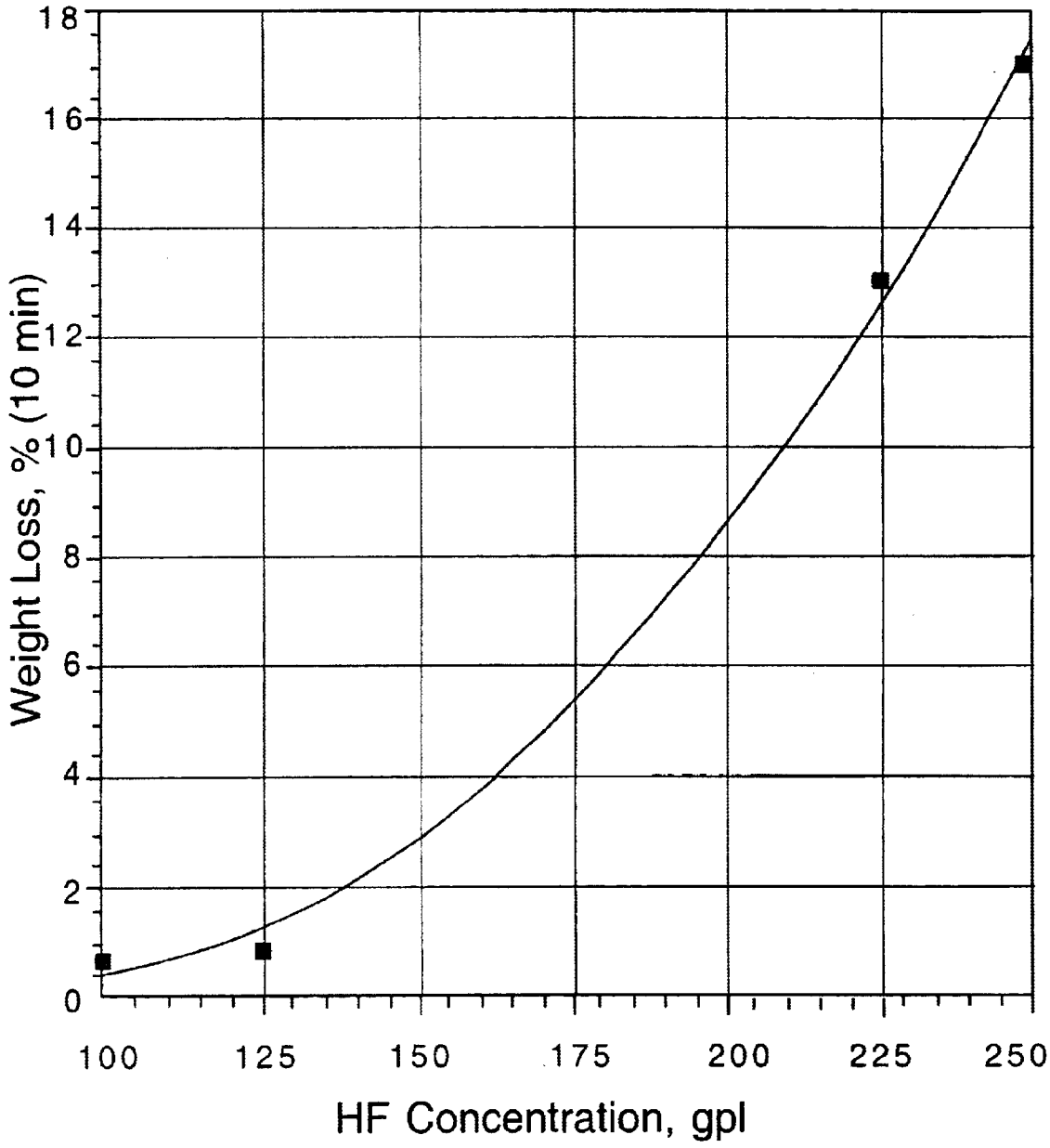
Figure 5:
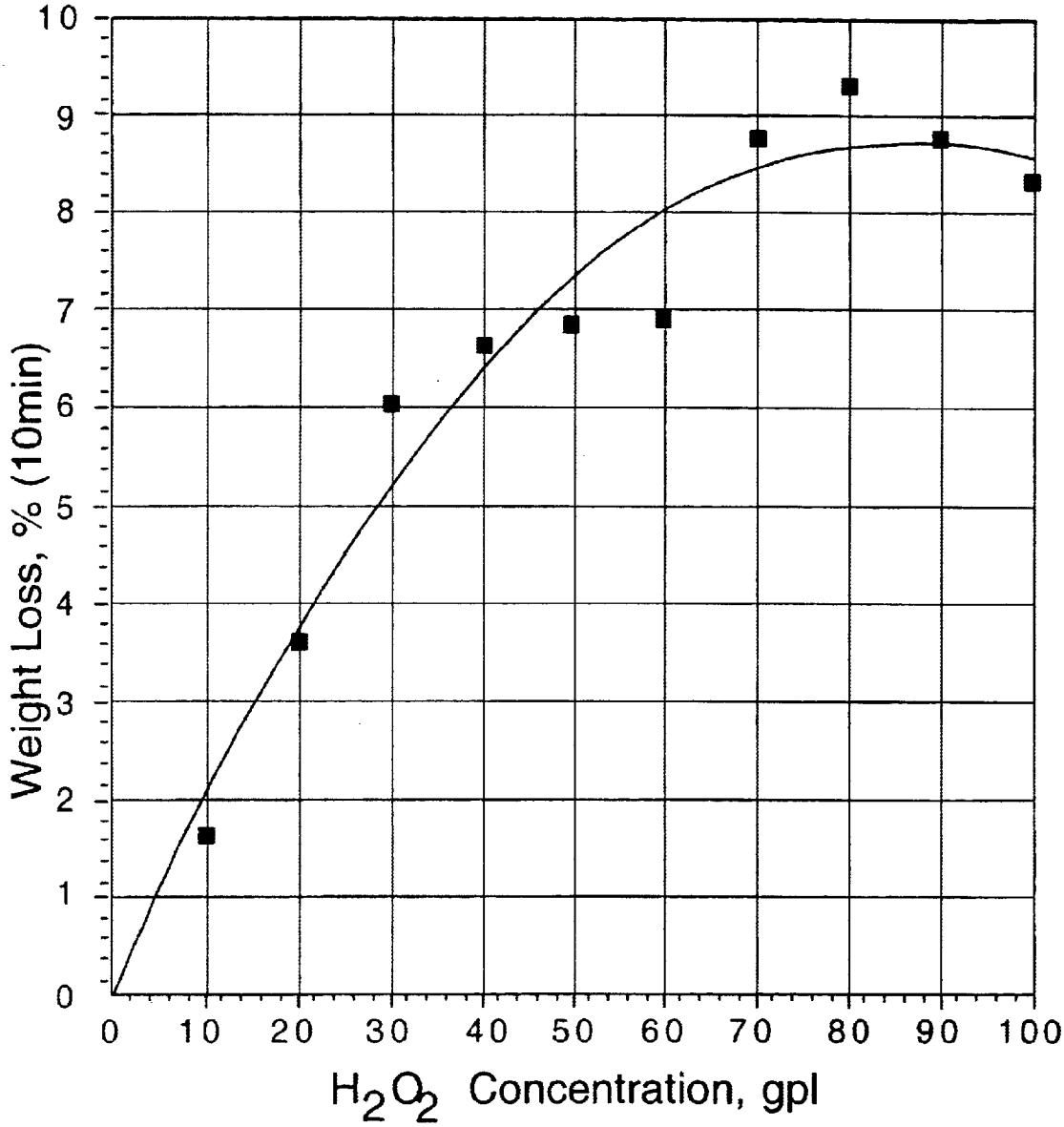
Figure 6:
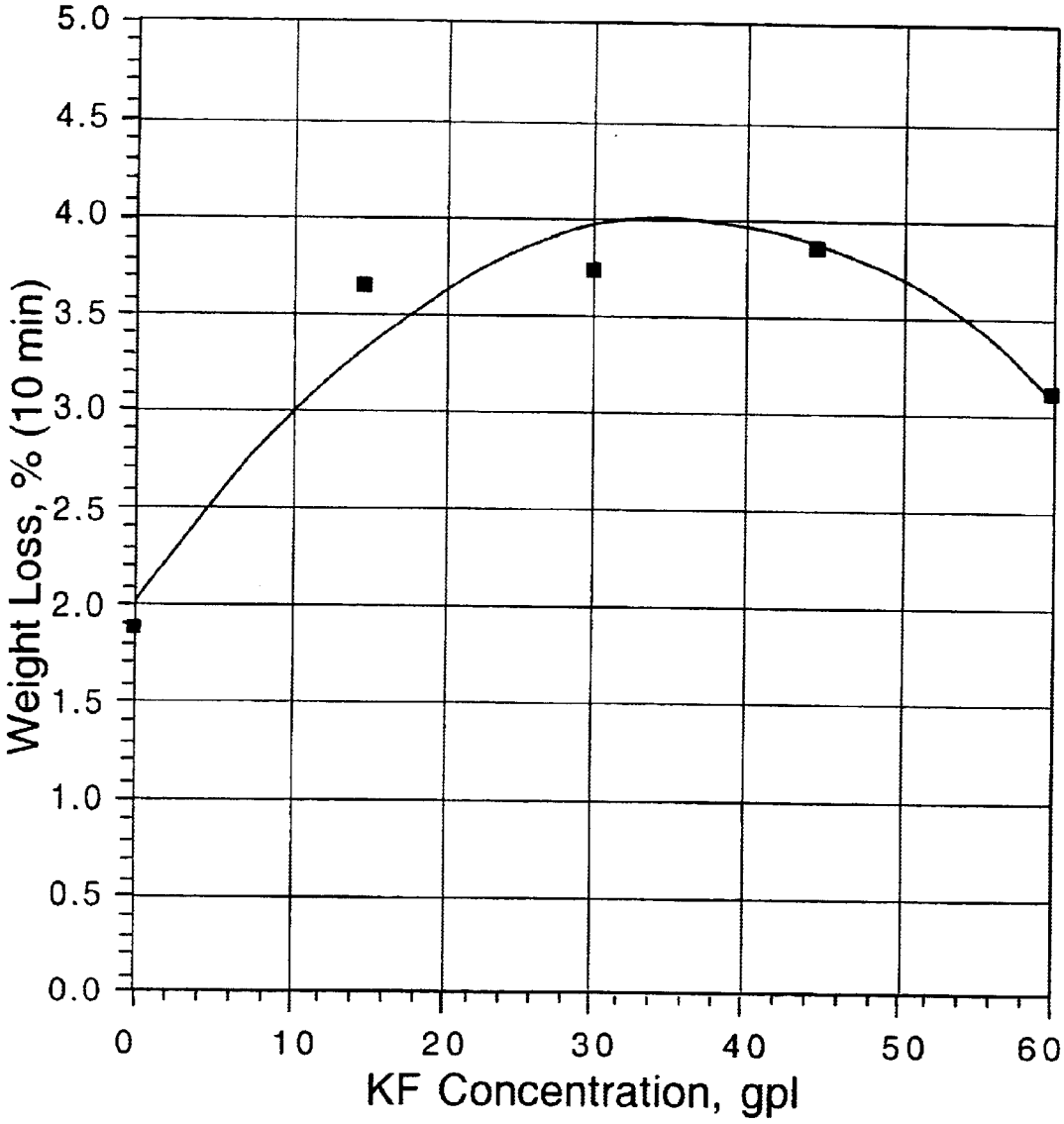
Figure 7:
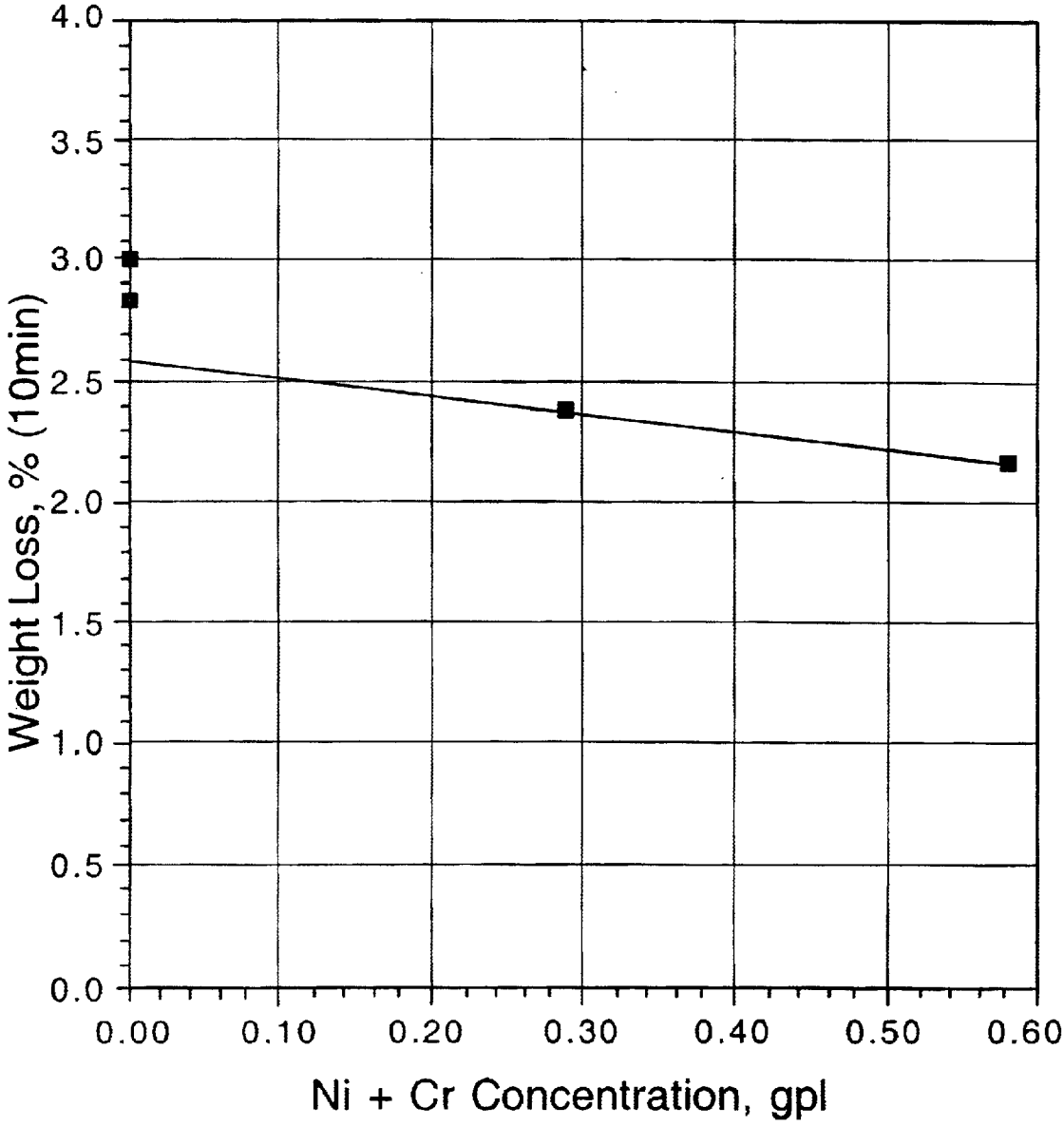
Figure 8:
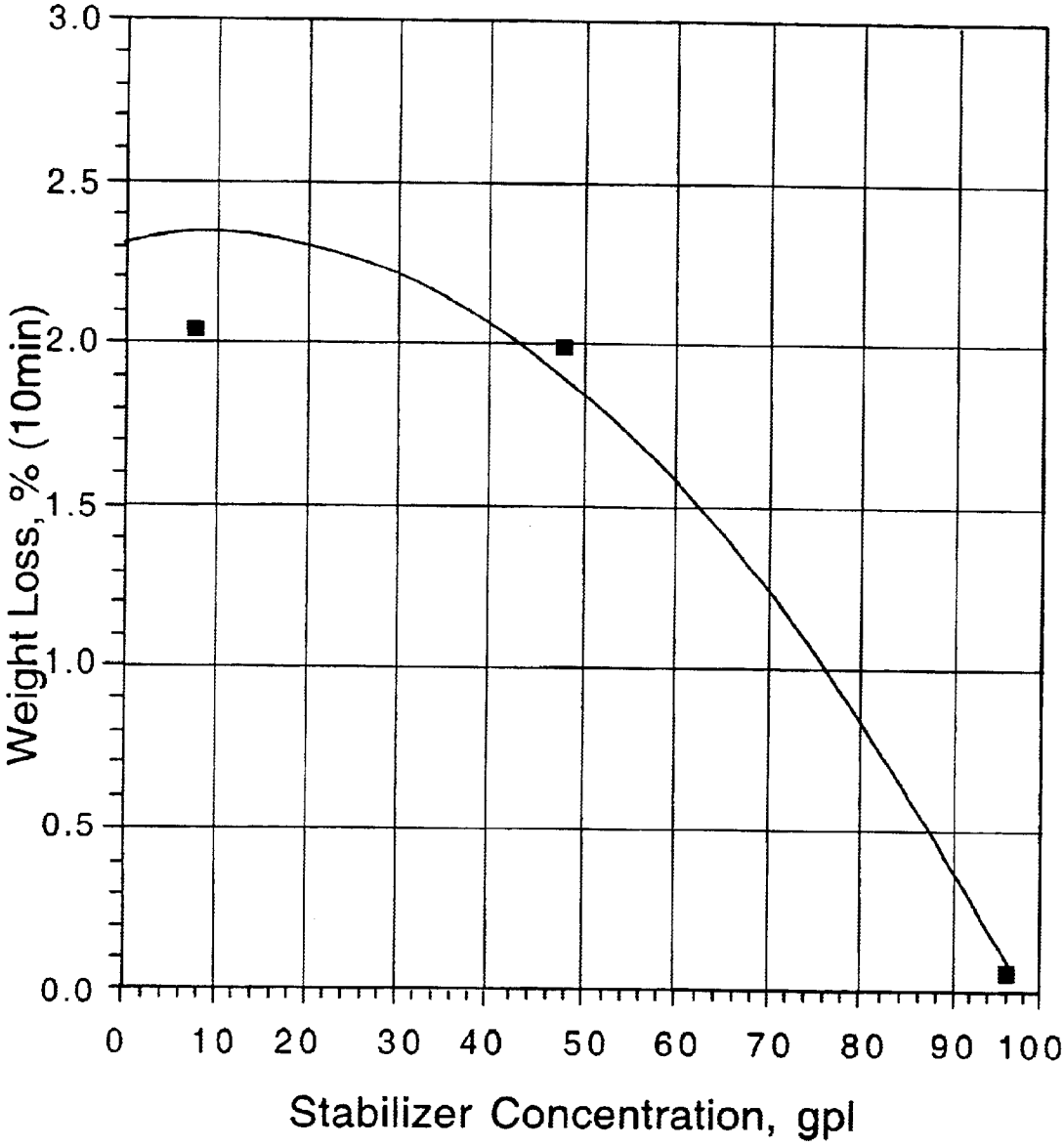
Figure 9:
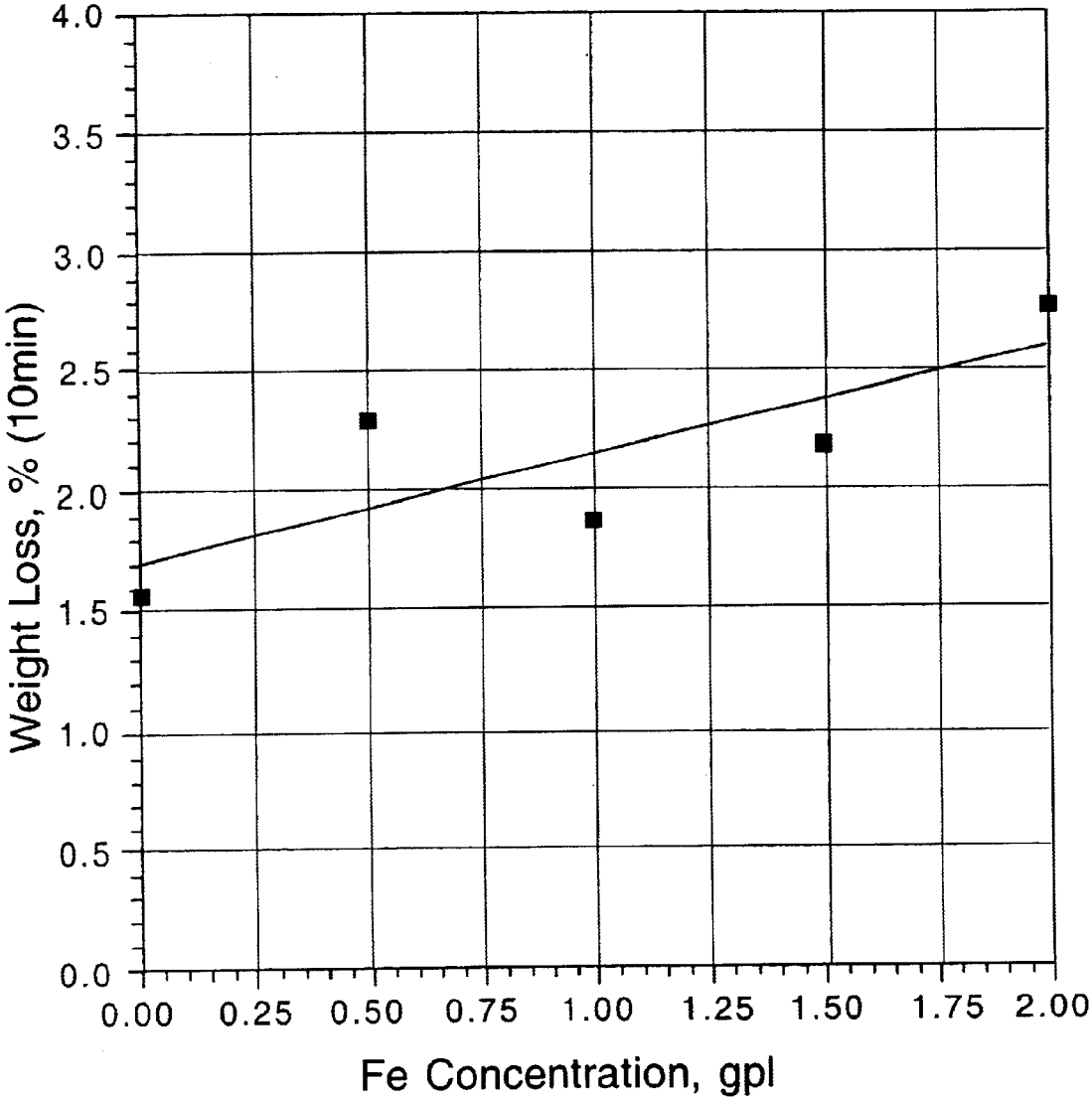

A 200 liter pickling bath pilot plant was created with a nominal composition of 150 gm. per liter (gpl) HF and 20 gpl $H_2O_2$, balance water, with 10 gpl added $H_2O_2$ stabilizer of conventional form. Many lots of drawn tantalum wire of 0.0284-inch diameter, and separately, 22–24 lb. batches (coils) of precursors of such wire as 0.44-inch square rods and 0.103 inch wire, as well as plates of niobium/tantalum alloy of 0.03 in. thickness by 8 in. wide, 8 in. long were immersed therein and held by stainless stel hangers for 5 to 20 minutes with a goal of removal of 0.2 to 0.4 mils (diameter basis). After HF and $H_2O_2$ concentration fell to points where pickling proceded slowly, or not at all, concentrations were increased to the nominal ones. Bath temperature was evaluated at 20° C. and 40° C. Even moderate bath agitation had a significant effect (FIG. 3). Table 1 shows weight loss of the wire samples and corresponding pickling rate at several levels of diameter reduction.

TABLE 1

Comparison of Tantalum Product Thickness Change, Weight Loss, and Pickling Rate Corresponding

| Reduction in Thickness or Diameter | | | Weight Loss, % | | Equivalent Pickling Rate, mg/(cm$^2$-min, at Indicated Pickling Time, min. | | |
|---|---|---|---|---|---|---|---|
| Mil | Micron | 0.44 Inch Square | 0.103-inch diam. wire | 0.0284-inch diam. wire | 5 | 10 | 20 |
| 0.2 | 5.1 | 0.091 | 0.39 | 1.4 | 0.84 | 0.42 | 0.21 |
| 0.3 | 7.6 | 0.136 | 0.58 | 2.1 | 1.26 | 0.63 | 0.32 |
| 0.4 | 10.2 | 0.182 | 0.78 | 2.8 | 1.68 | 0.84 | 0.42 |

The pickling rate as a function of temperature is shown in FIG. 1.

The bath was regenerated twice (first after pickling 1,000 lb. Ta and again after pickling another 1,000 lb Ta) by addition of KF. After initial crystallization at 20–30° C., small amounts of KF were added at 5° C. to accelerate recovery of Ta therein as a filterable $K_2TaF_7$ fine crystallized salt. The salt was washed and analyzed and found to be usable as a source material for Ta production. The bath solution was adjusted in concentrations of HF,$H_2O_2$ and stabilizer. KF addition is controlled so that very little appears in the regenerated bath (to avoid producing $K_2TaF_7$ on later pickled Ta surfaces). Before the first regeneration the solution had 85 gpl Ta and after regeneration it had 5 gpl Ta and 5 gpl K. The second regeneration had 50 gpl Ta before and 7 gpl Ta, 5 gpl K afterward. The progress of the solution was studied to avoid an Fe concentration (from the hangers) level as high as 2 gpl which might cause $H_2O_2$ decomposition. In fact the Fe maximum was seen to be less than 0.4 gpl.

The etched wire and strip surfaces were studied and found to be just as well pickled as with conventional HF/$HNO_3$ baths.

Overall it was found that pickling could proceed at concentrations of 110 to 150 gpl HF and 1 to 20 gpl $H_2O_2$ at 20–40° C. in times of 5 to 20 minutes

EXAMPLE 2

A typical application for a commercial scale pickling plant is now described.

In a typical wire drawing sequence where tantalum rod 0.44 in. square is reduced to 0.010 in. diameter wire in a series of—passes through—drawing dies, three or four intermediate pickling and annealing steps are required. FIG. 1A shows a contemplated production scale pickling facility with continuous tantalum removal for handling these materials in a pickling bath 10. Bath temperature is controlled via heat exchanger HE1 pump (P1). The KF is added on a batch or continuous basis to a crystallizer tank 12 and then to a settler tank 14. Fines of etched away tantalum (in the form of tantalum salt) are captured at a filter 16 using an ethanol wash solution. An example of sizes of the liquid tanks are 10–1000 gallons 12–200 gallons 14–100 gallons with processing of about 500 pounds of Ta (0.5 lb. per gallon of solution) at a time (typically for 10–20 minutes) in bath 10 to yield about 10–15 pounds a day of recovered tantalum salts. The chemical balance equations for dissolution of tantalum and iron, chromium, nickel impurities are given at FIG. 1B.

The bath 10 would typically be charged with 150 g/l HF, 10–20 gpl $H_2O_2$, and 10 gpl of a common $H_2O_2$ stabilizer such as G. W. Richards Co. Broxide-C. The stabilizers comprise antioxidants in propylene glycol solution.

Consumption of HF and $H_2O_2$is typically 0.55 and 0.47 pounds, respectively, per pound of dissolved tantalum. Overall, the tantalum dissolution target would be a 2—3% of tantalum weight to effectively remove a skin layer, with its impurities (with good recovery of removed tantalum during the regeneration step) while avoiding unnecessary deep etching.

KF addition to the crystallizer is preferred to enable adequate tantalum recovery. The residual KF in the pickle bath increases the pickling rate by a factor 1.1 to 2 times theoretical. This is a further advantage.

The equipment should be prepared from materials compatible with HF and $H_2O_2$, e.g. PVC, polypropylene, Viton, Kynar, Teflon and in regions not directly exposed to HF or $H_2O_2$ solution, stainless steel. The tanks could be stainless steel lined with PVC or polypropylene.

FIGS. 2, 3, 4, 5, 6, 7, 8, 9 show, respectively, effects—as determined in laboratory tests—on tantalum weight loss of temperature (2), agitation (3), HF concentration (4), $H_2O_2$ concentration, KF concentration (6), Ni+Cr concentration (7), $H_2O_2$ stabilizer concentration (8) and Fe concentration (9). The pilot plant testing shows a modification of such relationships in the course of processing in much larger volumes of the pilot plant compared to the laboratory tests.

The process of the invention is seen to be stable and easily adjustable through tailoring of these controllable parameters without serious conflict among them.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Process for surface finishing of tantalum parts in the course of mill processing or product fabrication to remove lubricant residue and surface contaminants comprising pickling the metal in an aqueous pickling solution for 5 to 100 minutes at 10 to 50° C., the solution comprising 100 to 400 g/l HF, 10 to 50 g/l $H_2O_2$, the bath being entirely free of nitrous oxide precursors;

treating the bath by addition of an alkali metal fluoride to form an alkali metal tantalum fluoride double salt that crystallizes out of solution in a form usable as a tantalum precursor and recovering the double salt while substantially avoiding salt deposition on the pickled tantalum/niobium surface; and operating the process substantially continuously with continuous or periodic: (a) removal of the double salt, (b) addition of the fluoride, and (c) replenishment of pickling solution components.

2. The process of claim 1 wherein the process is also established in a way to limit dissolution of Ta.

3. The process of claim 1 wherein the additive is potassium fluoride and the crystallized double salt is $K_2TaF_7$, the solution is chilled during crystallization to a depressed temperature compared to the normal pickling temperature to insure complete removal of the salt from the pickling solution.

4. The process of either of claims 1 or 3 wherein the pickling bath is agtitated.

5. The process of either of claims 1 or 3 wherein the pickling is conducted in a first tank and pickling fluid is then removed to a second tank for conversion of the refractory metal ions in solution to a precipitable compound by alkali metal fluoride addition and the precipitation occurs primarily in the second tank with liquid effluent from the second tank being recycled to the first tank with replenishment of pickling bath components from external sources as necessary.

6. The process of claim 5 wherein some of the alkali metal fluoride is also added to the first tank to accelerate pickling and reduce the rate of stainless steel material handling fixture dissolution in the pickling solution.

7. The process of either of claims 1 or 3 wherein the pickling and crystallization baths are controlled to limit $H_2O_2$ decomposition.

* * * * *